United States Patent
Lee et al.

(10) Patent No.: US 9,405,045 B2
(45) Date of Patent: Aug. 2, 2016

(54) OPTICAL APPARATUS

(75) Inventors: Jeong-Yub Lee, Seoul (KR); Kyu-Dong Jung, Suwon-si (KR); Seung-Wan Lee, Suwon-si (KR); Woon-Bae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1206 days.

(21) Appl. No.: 13/210,751

(22) Filed: Aug. 16, 2011

(65) Prior Publication Data

US 2012/0105971 A1 May 3, 2012

(30) Foreign Application Priority Data

Oct. 29, 2010 (KR) .................. 10-2010-0107110

(51) Int. Cl.
*G02B 1/06* (2006.01)
*G02B 3/14* (2006.01)
*G02B 7/02* (2006.01)

(52) U.S. Cl.
CPC . *G02B 3/14* (2013.01); *G02B 7/028* (2013.01)

(58) Field of Classification Search
CPC .............................. G02B 3/14; G02B 26/005
USPC ................................. 359/665–666
See application file for complete search history.

(56) References Cited

U.S. PATENT DOCUMENTS

| 5,574,598 | A | 11/1996 | Koumura et al. |
| 6,188,526 | B1 * | 2/2001 | Sasaya et al. ................. 359/666 |
| 7,068,439 | B2 | 6/2006 | Esch et al. |
| 7,256,943 | B1 | 8/2007 | Kobrin et al. |
| 7,359,124 | B1 | 4/2008 | Fang et al. |
| 7,369,321 | B1 | 5/2008 | Ren et al. |
| 7,440,193 | B2 | 10/2008 | Gunasekaran et al. |
| 7,551,364 | B2 | 6/2009 | Bae et al. |
| 7,580,195 | B2 | 8/2009 | Choi et al. |

(Continued)

FOREIGN PATENT DOCUMENTS

| CN | 1189219 A | 7/1998 |
| CN | 101715561 A | 5/2010 |

(Continued)

OTHER PUBLICATIONS

Communication dated Aug. 4, 2014 issued by the State Intellectual Property Office of the People's Republic of China in counterpart Chinese Patent Application No. 201110335853.7.

(Continued)

*Primary Examiner* — James Greece
(74) *Attorney, Agent, or Firm* — Sughrue Mion, PLLC

(57) ABSTRACT

An optical apparatus such as a varifocal fluidic lens is provided. Optical apparatus includes a spacer frame, optical fluid, an elastic membrane, an actuator, an actuator frame, and a thermally deformable frame. Spacer frame defines an internal space including a lens portion and a driving portion that connect to each other, and the driving portion is disposed to surround the lens portion disposed in the center area of the internal space. Optical fluid is filled in the internal space defined by the spacer frame. The elastic membrane is attached on a surface of the spacer frame, to cover a side of the internal space, and the thermally deformable plate is attached on the other surface of the spacer frame, to cover the other side of the internal space. The thermally deformable plate deforms to increase or decrease a volume of the internal space according to a change in temperature.

15 Claims, 14 Drawing Sheets

(56) References Cited

U.S. PATENT DOCUMENTS

| | | |
|---|---|---|
| 8,072,689 B2 | 12/2011 | Bolis |
| 8,300,317 B2 | 10/2012 | Lee et al. |
| 8,390,939 B2 | 3/2013 | Henriksen et al. |
| 2007/0030573 A1 | 2/2007 | Batchko et al. |
| 2007/0201138 A1 | 8/2007 | Lo |
| 2007/0211207 A1 | 9/2007 | Lo et al. |
| 2007/0263293 A1 | 11/2007 | Batchko et al. |
| 2008/0112059 A1 | 5/2008 | Choi et al. |
| 2008/0144186 A1 | 6/2008 | Feng et al. |
| 2008/0285143 A1 | 11/2008 | Batchko et al. |
| 2009/0010562 A1 | 1/2009 | Chung |
| 2009/0021823 A1 | 1/2009 | Heim et al. |
| 2010/0079873 A1 | 4/2010 | Wang et al. |
| 2010/0118413 A1* | 5/2010 | Kim et al. ............ 359/666 |
| 2010/0118414 A1 | 5/2010 | Bolis |
| 2010/0182703 A1 | 7/2010 | Bolis |
| 2010/0276491 A1* | 11/2010 | Havens et al. ........ 235/470 |

FOREIGN PATENT DOCUMENTS

| | | |
|---|---|---|
| EP | 2192425 A1 | 6/2010 |
| JP | 6-308303 A | 11/1994 |
| JP | 7-049404 A | 2/1995 |
| JP | 2000-081503 A | 3/2000 |
| JP | 2006-178447 A | 7/2006 |
| JP | 2007-219521 A | 8/2007 |
| JP | 2009-175536 A | 8/2009 |
| JP | 2010-097200 A | 4/2010 |
| JP | 2010-156947 A | 7/2010 |
| JP | 2010-533886 A | 10/2010 |
| KR | 10-0672373 B1 | 1/2007 |
| KR | 10-2008-0043106 A | 5/2008 |
| KR | 10-2008-0064237 A | 7/2008 |
| WO | 96/35967 A1 | 11/1996 |
| WO | 0201277 A2 | 1/2002 |
| WO | 02/12925 A3 | 2/2002 |
| WO | WO 2007/017089 A1 | 2/2007 |
| WO | 2008/082025 A1 | 7/2008 |
| WO | 2008100154 A1 | 8/2008 |
| WO | WO 2008/100154 A1 | 8/2008 |
| WO | 2009/010562 A1 | 1/2009 |
| WO | 2010/005315 A1 | 1/2010 |
| WO | 2010/032869 A1 | 3/2010 |

OTHER PUBLICATIONS

Communication dated Apr. 11, 2014 issued by the United States Patent and Trademark Office in counterpart U.S. Appl. No. 13/035,072.
Communication dated Sep. 5, 2014 issued by the United States Patent and Trademark Office in counterpart U.S. Appl. No. 13/035,072.
Communication dated Apr. 3, 2012 issued by the European Patent Office in counterpart European Patent Application No. 11181168.3.
European Patent Office, Communication dated Dec. 8, 2011, issued in corresponding European Patent Application No. 11163986.0.
K. Jeong et al., "Tunable Mircodoublet Lens Array", Optics Express 2004, vol. 12, No. 11, pp. 2494-2500.
A. Werber et al., "Tunable, Membrane-Based, Liquid-Filled Micro-Lenses", Laboratory for Micro-optics, The 13th International Conference on Solid-State Sensors, Actuators and Microsystems, Jun. 5-6, 2005, vol. 1, pp. 1018-1021.
Search Report, dated Nov. 5, 2010, issued in European Patent Application No. 10171907.8.
Search Report, dated Nov. 5, 2010, issued in European Patent Application No. 10171910.2.
U.S. Appl. No. 13/035,072.
U.S. Appl. No. 12/787,787.
U.S. Appl. No. 12/784,625.
Communication dated Mar. 3, 2015 issued by the Japanese Patent Office in counterpart Japanese Patent Application No. 2011-222134.

* cited by examiner

OPTICAL APPARATUS

CROSS-REFERENCE TO RELATED APPLICATION

This application claims priority from Korean Patent Application No. 10-2010-0107110, filed on Oct. 29, 2010, the entire disclosure of which is incorporated herein by reference for all purposes.

BACKGROUND

1. Field

Apparatuses consistent with the exemplary embodiments relate to an optical apparatus such as a fluidic lens.

2. Description of the Related Art

With development of digital technologies, digital convergence is being expanded rapidly. In particular, in media and communication fields, digital convergence is most actively advancing. Representative digital convergence products are mobile communication devices. Recently, various imaging devices, such as a digital camera, a digital camcorder, and the like, as well as devices for games, music playback, broadcasting, the Internet, etc., are combined with mobile communication devices. Such imaging devices are widely installed in various mobile communication devices, such as a mobile phone, a laptop computer, a Personal Digital Assistant (PDA), etc.

Recently, in accordance with miniaturization, slimness, and popularization of mobile electronic equipment with an imaging device, a need for a small-sized, slim and low-cost imaging device is increasing. In particular, since recent mobile devices are released with various digital electronic devices (for example, a MP3 player, a video player, a DMB television, etc.) as well as an imaging device, a need for a small-sized, slim imaging device is more increasing. However, an imaging device including a focusing optical system is one type of electronic equipment that has great difficulties in reducing their size or thickness.

Initial models of mobile electronic devices with imaging devices did not require high performance of imaging devices. However, recently, in order to meet various requirements or tastes of consumers, a variety of mobile devices with imaging devices have been developed, and performance requirements for such mobile devices, such as resolution, are also increasing. For example, initial imaging devices have supported only limited functions such as a macro mode with a fixed and shortest focal distance of 60 cm, but recently developed imaging devices are supporting more various functions, including an auto focus function, a zoom function, a macro mode allowing photographing within 30 cm or less, an image stabilization function, and so on.

In order to implement the auto focus function, the zoom function, the macro mode, etc., in an imaging device, a function of adjusting the focal distance of focusing optical system is needed. As a method for varying the focal distance of focusing optics, a method of using a step motor, a method of using a Voice Coil Motor (VCM), etc., have been utilized. These methods drive a motor, etc., to change the distances between lenses of focusing optics and thus vary a focal distance. Thus, the methods have limitation in reducing the size of an image device, and also have difficulties in integrally fabricating an image device, which becomes a factor of increasing manufacturing costs.

In order to overcome these drawbacks, a method of using a fluidic lens has been suggested. A fluidic lens is a kind of optical apparatus having a structure where optical fluid is sealed up by an optical membrane. In the fluidic lens, curvature of the lens surface varies by adjusting pressure that is applied to the lens surface of the optical membrane. A representative example of such a fluidic lens is disclosed in Korean Laid-open Patent Application No. 2008-0043106, entitled "Optical Lens and Manufacturing Method thereof", filed by the same applicant, the entire disclosure of which is incorporated herein by reference for all purposes.

Since a fluidic lens can vary a focal distance using changes in curvature of the lens surface, it is not needed to change the distances between lenses of focusing optics in order to adjust the focal distance. Accordingly, since an imaging device with a fluidic lens requires neither a step motor nor a VCM, etc., to move lenses of focusing optics, and also does not need to ensure a separate space for moving the lenses, the imaging device can be fabricated to be compact. Also, since the fluidic lens disclosed in the above-mentioned Korean Laid-open Patent Application can be fabricated in wafer level, the fluidic lens is suitable to mass production and contributes to a reduction of manufacturing costs.

Meanwhile, most of electronic equipment with a mobile device is designed to stably operate within a predetermined temperature range. The operating temperature of electronic equipment may depend on purposes or functions. Also, the operating temperature range of personal portable electronic devices is generally from about −20° C. to about 60° C. The operating temperature range is also applicable to imaging devices with fluidic lenses.

However, optical fluid used in a fluidic lens has a relatively large coefficient of thermal expansion (CTE) and accordingly, has relatively large changes in volume with respect to changes in temperature. Since the fluidic lens changes curvature of the lens surface depending on pressure that is applied to an optical membrane by the optical fluid in order to adjust a focal distance, the curvature of the lens surface, that is, the focal distance of the fluidic lens, is affected by changes in temperature. The phenomenon may prevent the fluidic lens from operating stably within a predetermined operating temperature range (for example, from −20° C. to 60° C.).

SUMMARY

The following description relates to an optical apparatus, such as a fluidic lens, that can ensure stable operation regardless of changes in temperature.

The following description also relates to an optical apparatus, such as a fluidic lens, whose focal distance does not change when the volume of optical fluid changes due to changes in temperature.

In one general aspect, there is provided an optical apparatus including a spacer frame defining an internal space, wherein the internal space includes a driving portion and a lens portion that connect to each other. The internal space defined by the spacer frame is filled with optical fluid. An elastic membrane and a thermally deformable plate are respectively attached onto the bottom-side and top-side surfaces of the spacer frame, wherein the elastic membrane covers at least the lens portion, and the thermally deformable plate, i.e., a thermally deformable member, formed with a single transparent material deforms to increase or decrease the volume of the internal space according to changes in temperature. A portion of the thermally deformable plate, corresponding to the lens portion, may be flat while being protruded outwardly rather than the edge of the thermally deformable plate.

In another general aspect, there is provided an optical apparatus including a spacer frame defining an internal space, wherein the internal space includes a driving portion and a lens portion that connect to each other. The internal space defined by the spacer frame is filled with optical fluid. An elastic membrane is attached onto a surface of the spacer frame, to cover at least the lens portion. Also, a thermally deformable plate and a flange unit are disposed on the other surface of the spacer frame, wherein the thermally deformable plate is disposed in correspondence to the internal space, and deformed to increase or decrease the volume of the internal space according to changes in temperature, and the flange unit is disposed along the edge of the thermally deformable plate, in correspondence to the top surface of the spacer frame. The optical apparatus may further include a stiffening member. The stiffening member is flat, and disposed in the thermally deformable plate, at a location corresponding to the lens portion. The stiffening member may be positioned in the inside of the thermally deformable plate.

In another general aspect, there is provided an optical apparatus including a spacer frame defining an internal space that includes a driving portion and a lens portion. The internal space defined by the spacer frame is filled with optical fluid. An elastic membrane is attached onto a surface of the spacer frame, to cover at least the lens portion, and a thermally deformable plate formed with a single transparent material is disposed on the other surface of the spacer frame. The thermally deformable plate may be deformed to increase or decrease the volume of the internal space according to changes in temperature. A transparent stiffening member having a flat shape may be disposed in the thermally deformable plate, at a location corresponding to the lens portion.

In another general aspect, there is provided an optical apparatus including a spacer frame, an optical portion, a thermally deformable plate, and an optical material. The optical portion is disposed on a surface of the spacer frame, and the thermally deformable plate is disposed on the other surface of the spacer frame, that is, on the opposite surface of the surface on which the optical portion is disposed. The optical material is filled in an internal space defined by the spacer frame, the optical portion, and the thermally deformable plate. Also, the thermally deformable plate and the spacer frame are formed with different materials, and the thermally deformable plate has a predetermined shape and may be deformed to increase or decrease the volume of the internal space according to changes in temperature.

Other features and aspects will be apparent from the following detailed description, the drawings, and the claims.

Figure 1:
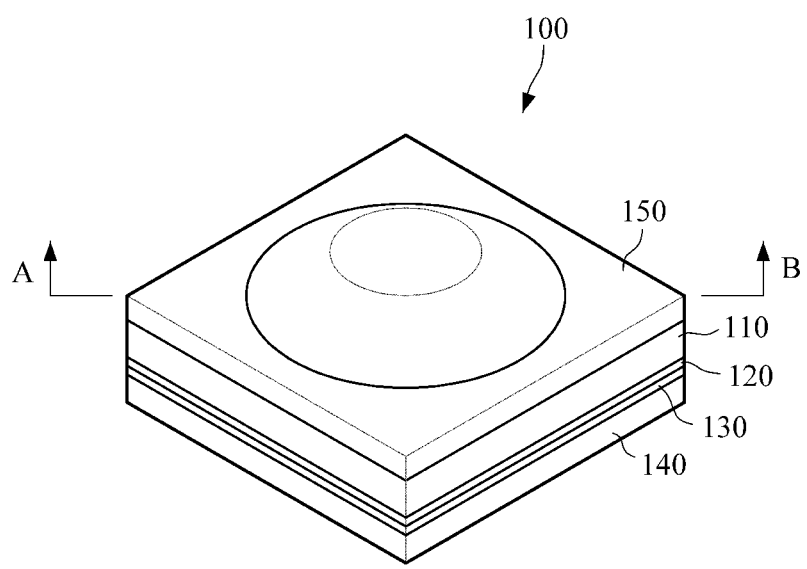
FIG. 1 is a perspective view illustrating an example of an optical apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Also, the meaning that a first material layer is formed on a second material layer has to be interpreted to include all the cases that the first material layer is formed directly on the second material layer and that another third material layer is inserted between the second material layer and the first material layer, if there is no explicit description excluding the cases.

Figure 2:
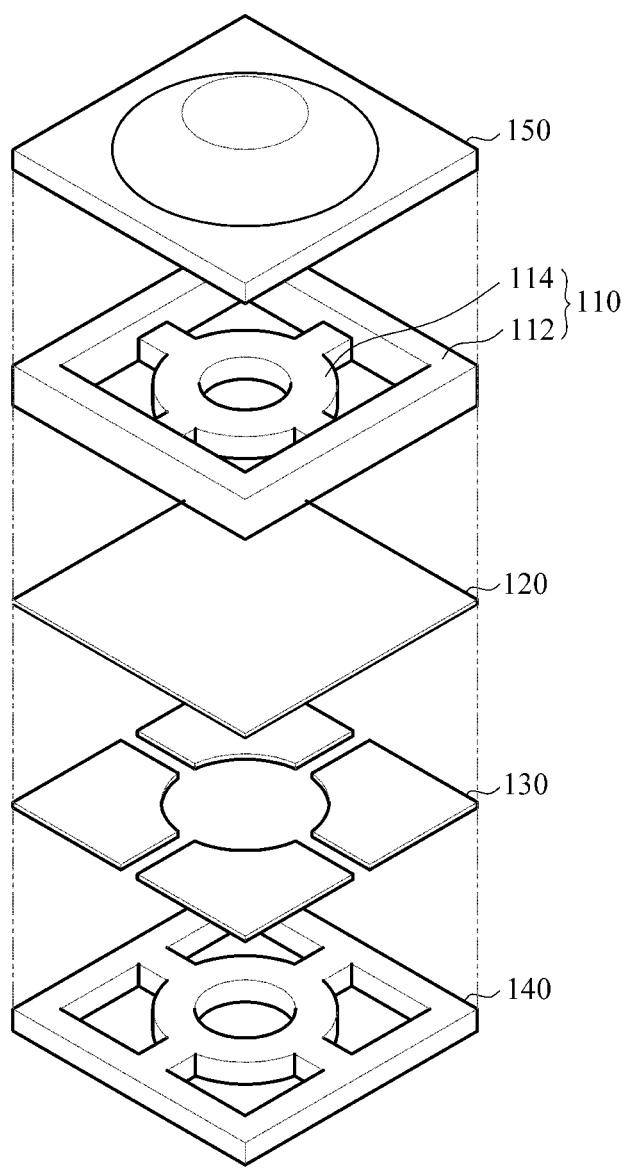
FIG. 2 is an exploded perspective view illustrating the optical apparatus illustrated in FIG. 1.
Figure 3:
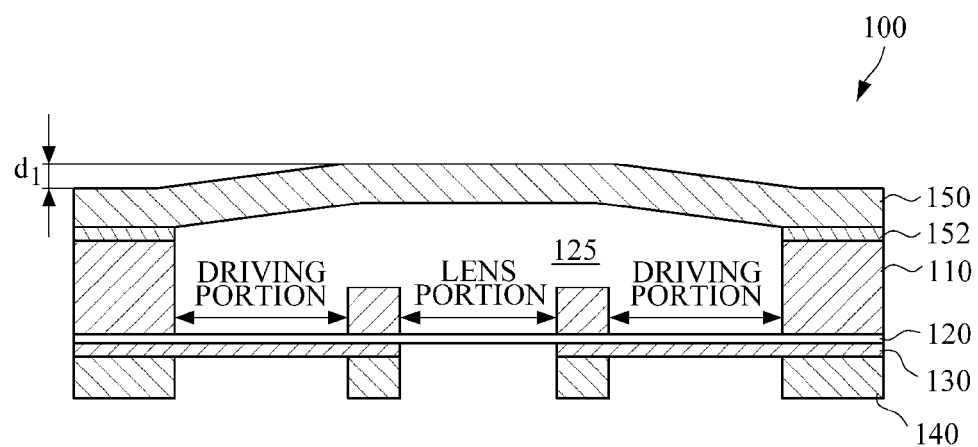
FIG. 3 is a cross-sectional view of the optical apparatus cut along a line A-B of FIG. 1.

FIG. 1 is a perspective view illustrating an example of an optical apparatus 100, FIG. 2 is an exploded perspective view illustrating the optical apparatus 100 illustrated in FIG. 1, and FIG. 3 is a cross-sectional view of the optical apparatus 100 cut along a line A-B of FIG. 1. The optical apparatus 100 illustrated in FIGS. 1, 2, and 3 may be a fluidic lens included in a camera module of a mobile device. Alternatively, the fluidic lens may be included in any other suitable electronic device. The following descriptions will be given under an assumption that the optical apparatus 100 is a fluidic lens. However, the optical apparatus 100 is not limited to a fluidic lens and can be used for various purposes.

Referring to FIGS. 1, 2, and 3, the optical apparatus 100 includes a spacer frame 110, an elastic membrane 120, a thermally deformable plate 150, and an optical fluid 125. Also, the optical apparatus 100 may further include an actuator 130 and an actuator frame 140. FIGS. 1, 2, and 3 show the shape of the optical apparatus 100 at a room temperature, and the shape of the optical apparatus 100, in more detail, the shape of the thermally deformable plate 150 may change when the temperature changes.

The optical apparatus 100 may be itself used as a fluidic lens in an imaging device or attached to a focusing optical system of an imaging device. In the former case, the optical apparatus 100 may change its own focal distance. However, in the latter case, the optical apparatus 100 may be used to change the focal distance of the focusing optical system. Also, in both the former and latter cases, the imaging device may implement varifocal functions, such as an auto focus function, a zoom function, and/or a macro function, by changing a focal distance through the optical apparatus 100.

The spacer frame 110 defines a predetermined internal space in which optical fluid 125 is disposed or filled. In more detail, a predetermined internal space in which optical fluid 125 is disposed or filled is defined and sealed up by the spacer frame 110, the elastic membrane 120, and the thermally deformable plate 150. In an exemplary embodiment, the optical fluid fills up the predetermined internal space. For the predetermined internal space, the spacer frame 110 includes sidewalls 112 that surround the internal space. Also, the spacer frame 110 may include a partition 114 for partitioning the internal space into a lens portion and a driving portion that connect to each other. For example, the lower portion of the internal space may be partitioned into a lens portion and a driving portion by the partition 114, and the lens portion and the driving portion may connect to each other in the upper portion of the internal space. The partition 114 may be structurally connected to the sidewalls 112. The spacer frame 110 may be formed with a hard material such as silicon having excellent chemical resistance and moisture resistance, or with a transparent or opaque material. The partition 144 is formed so that the optical fluid 125 can freely flow between the lens and the driving portions. In an exemplary embodiment, the height of the partition 114 is less half of the total height of the spacer frame 110. In yet another exemplary embodiment, the height of the partition 114 is in the range of 150-200 μm.

The lens portion is a portion through which incident light passes, that is, a portion functioning as a lens. The driving portion is a portion for transferring driving force to change the profile of a portion (a lens surface) of the elastic membrane 120 covering the lens portion. In more detail, when predetermined pressure (for example, predetermined pressure by driving of the actuator 130) is applied to the driving portion of the optical fluid 125, the optical fluid 125 over the driving portion moves toward the lens portion. As a result, the amount of the optical fluid 125 over the lens portion increases to increase pressure applied to the elastic membrane 120 constructing the lens surface, so that the lens surface deforms to an upwardly protruded shape, that is, to a convex lens shape. At this time, by adjusting pressure applied to the driving portion of the optical fluid 125 to control the deformed degree, i.e., the amount of deformation, of the lens portion, that is, the curvature of the convex lens, the refractive power of the optical apparatus 100 may be controlled.

The lens portion may be disposed in the center portion of the optical apparatus 100, and the driving portion may be disposed to surround the lens portion. If the driving portion is disposed to surround the lens portion, the optical fluid 125 may flow from the driving portion to the lens portion uniformly from all directions. Accordingly, the lens portion deformed due to the flow of the optical fluid 125 may have a convex lens shape with a more spherical morphology, and accordingly a varifocal fluidic lens having excellent optical performance may be implemented. The driving portion may be partitioned into a plurality of areas. For example, as illustrated in FIG. 2, the driving portion may be partitioned into four areas that are symmetrical about the lens portion. However, it is also possible that the driving portion is partitioned into two, three, five or more areas.

Partitioning the internal space defined by the spacer frame 110 into the driving portion and the lens portion may be performed virtually without a physical structure such as the partition 114. That is, the spacer frame 110 may have a cylindrical or rectangular shape, which is defined only by the sidewalls 112 and whose internal space is surrounded by only the sidewalls 112. In this case, partitioning the internal space into the driving portion and the lens portion may be done according to the functional features (for example, in the internal space, the driving portion may correspond to an actuator 130 and the lens portion may correspond to a stiffening member (160 of FIG. 5A or 160' of FIG. 5B)), and/or according to the structural relationship with the peripheral members.

The internal space defined by the spacer frame 110, that is, the driving portion and the lens portion, is filled with the optical fluid 125. The optical fluid 125 is a kind of an optical material that can be filled in the internal space, and is not limited to a liquid. For example, the optical fluid 125 may be a gas or a gel type material. The optical fluid 125 filled in the internal space is sealed up by the elastic membrane 120 and the thermally deformable plate 150 respectively attached onto or disposed on the bottom and the top surfaces of the spacer frame 110. The optical fluid 125 may be transparent silicone oil such as dimethylsiloxane (DMS) oil, transparent hydrocarbon oil, transparent ester oil, or transparent polyether oil such as perfluoropolyether (PFPE). The silicone oil or polyether oil among above-mentioned materials is maintained in the liquid phase within a temperature range from about −55° C. to about 250° C., and generally has relatively small changes in viscosity with respect to temperature. For example, transparent silicone oil having a 50 or more degree of polymerization at viscosity of 1000 centipose (cP) or less may be used as optical fluid 125, and in this case, the optical apparatus 100 may achieve very high response speed. In an exemplary embodiment, the optical fluid 152 may have a viscosity of less than 100 cP. However, silicone oil or polyether oil has a large coefficient of thermal expansion (CTE) of 330 ppm/° C. or more. Any other materials or substances which satisfy the above physical characteristics may be suitably used.

The elastic membrane 120 is attached onto a surface (the lower surface in FIGS. 1, 2, and 3) of the spacer frame 110, to cover the lens portion of the internal space. The portion of the elastic membrane 120, covering the lens portion, may correspond to an optical portion forming the lens surface of the optical apparatus 100. The elastic membrane 120 also may cover the driving portion of the internal space, and in this case, the elastic membrane 120 may be a sheet-like film. However, the driving portion of the internal space may be covered by an elastic membrane different from such an optical portion or by any other element other than an elastic membrane.

The elastic membrane 120 has to have transparency and high elasticity, and also has to be chemically stabilized. Also, the outer surface of the elastic membrane 120 has to have moisture resistance. Materials satisfying the above conditions include a polydimethylsiloxane (PDMS) elastomer, polymethylphenylesiloxane (PMPS) elastomer, transparent silicon elastomer such as flurosilicone elastomer, hydrocarbon elastomer, polyether elastomer, ptopylenoxide elastomer, and polyester elastomer. The elastic membrane 120 is not limited to a single-layered structure, and may be a multi-layered structure formed of a double layer. Any other materials or substances which satisfy the above physical characteristics may be suitably used.

The above-mentioned elastomers are materials having a large CTE, and a membrane formed only with such elastomer is greatly expanded or contracted according to changes in temperature. However, the elastic membrane 120 used as a component of the optical apparatus 100 illustrated in FIGS. 1, 2, and 3 is attached onto the spacer frame 110 in such a manner so that it does not expand or contract depending on changes in temperature. For example, in fabrication, a solution-phase PDMS is solidified on a fixed substrate, in the form of a membrane and the resultant elastic membrane 120 is attached onto the spacer frame 110 after being sufficiently pulled to have a very thin thickness, and/or is subject to predetermined processing for preventing thermal expansion and then attached onto the spacer frame 110. For example, the elastic membrane 120 may be stretched or pulled to have tensile residual stress that is sufficient to prevent its buckling or deformation during the thermal expansion of the thermally deformable plate 150.

In an exemplary embodiment, the elastic membrane 120 may be manufactured in a pre-load state so that a length of the elastic membrane 120 in the pre-load state is 39.00 mm, while the removal of the pre-load results in the length being reduced 3.85% to 37.5 mm. The pre-load can be calculated by measuring the variation in the length of the elastic membrane 120, after removing the pre-load. In an exemplary embodiment, the CTE range for the elastic membrane 120 is from 180 ppm/° C. to 320 ppm/° C.

When formed of the same material, the thickness of the thermally deformable plate 150 may be three or four times the thickness of the elastic membrane 120. In another exemplary embodiment the thermally deformable plate 150 may be six times the thickness of the elastic membrane 120.

The actuator 130 may be a polymer actuator that is disposed on the elastic membrane 120 at a location corresponding to the driving portion. The polymer actuator 140 may be a single structure corresponding to the driving portion or may be partitioned into a plurality of areas. Also, the polymer actuator 130 may be attached onto the elastic membrane 120 using a predetermined bonding material. The kind or material of the actuator 130 is not limited, and various actuators may be used. For example, the actuator 130 may be made of Electro Active Polymer (EAP) having a thin thickness and low consumption power, or may be a relaxor ferroelectric polymer actuator made of a terpolymer, such as poly(vinylidenefluoride-trifluoroethylene-chlorotrifluoroethylene [P(VDF-TrFE-CTFE)] or poly(vinylidenefluoride-trifluoroethylene-chlorofluoroethylene) [P(VDF-TrFE-CFE)]. Any other materials or substances which satisfy the above physical characteristics may be suitably used.

The actuator 130 functions to flow the optical fluid 125 in the driving portion to the lens portion by applying pressure to the driving portion when a predetermined driving voltage is applied to the actuator 130, so that the elastic membrane 120 of the lens portion protrudes out to become convex. In this case, displacement of the actuator 130 may be controlled by adjusting the magnitude of the driving voltage, and accordingly, pressure applied to the optical fluid 125 in the driving portion also may be controlled. Such a polymer actuator 130 is an example of a pressing device that applies pressure to the driving portion to flow the optical fluid 125 toward the lens portion so that a lens surface protrudes outward. Accordingly, it is also possible to flow the optical fluid 125 over the driving portion toward the lens portion by using a micropump, etc., instead of the polymer actuator 130. Due to the design of the partition 114, there is an instantaneous or near instantaneous flow of the optical fluid 125 from the driving portion to the lens portion, and vice versa. In other words, the partition 114 does not restrict the flow of the optical fluid 125 such that the pressures at the driving portion and the lens portion gradually equalize over time.

An actuator frame 140 may be disposed as a fixed frame on the actuator 130. The actuator frame 140 functions to firmly fix the elastic membrane 120 and/or the actuator 130 onto the spacer frame 110. The actuator frame 140 has a flat shape to expose the elastic membrane 120 corresponding to at least the lens portion, and may expose a part of the actuator 130. For example, the actuator frame 140 may expose only a portion of the elastic membrane 120, corresponding to the driving portion and the lens portion, and have a flat shape that is axial-symmetrical to an optical axis. The actuator frame 140 may be formed with a hard material such as silicon that has a small CTE.

The thermally deformable plate 150 is attached onto the other surface of the spacer frame 110, that is, onto the surface (the upper surface of the spacer frame 110 in FIGS. 1, 2, and 3) opposite to the surface of the spacer frame 110 onto which the elastic membrane 120 is attached. The thermally deformable plate 150 may cover the entire or a part of the internal space defined by the spacer frame 110. For example, the thermally deformable plate 150 is fabricated to have the same size (width) as the spacer frame 110, thus covering all of the driving portion and lens portion of the internal space, and the edge portion of the thermally deformable plate 150 may be bonded to the sidewalls 112 of the spacer frame 110. However, the size of the thermally deformable plate 150 may correspond to the width of the internal space (see FIG. 7), or may be smaller than the width of the internal space.

The thermally deformable plate 150 deforms or changes in shape according to changes in temperature, thereby compensating for changes in volume of the optical fluid 125 with respect to the changes in temperature. In more detail, the thermally deformable plate 150 deforms outward (upward in FIG. 3) when the temperature rises to increase the volume of the internal space, and deforms inward (downward in FIG. 3) when the temperature decreases to decrease the volume of the internal space. Due to the deformation of the thermally deformable plate 150, the optical fluid 125 whose volume has increased according to a temperature increase is filled in the internal space whose volume has increased, and the optical fluid 125 whose volume has decreased according to a temperature decrease is filled in the internal space whose volume has decreased. As a result, the optical apparatus 100 does not deform the lens surface or minimizes deformation of the lens surface when the volume of the optical fluid 125 changes according to a change in temperature.

In a conventional fluidic lens disclosed in Korean Laid-open Patent application No. 2008-0043106, entitled "Optical Lens and Manufacturing Method thereof", filed by the same applicant, a transparent, rigid glass substrate is used instead of the thermally deformable plate 150. As described above, the optical fluid 125 made of silicone oil, etc. has a significantly large CTE of about 330 ppm/° C. Meanwhile, if a spacer frame and a glass substrate are formed with silicon, they have a CTE of about 2-3 ppm/° C. that is significantly smaller than that of the optical fluid 125. Accordingly, when there is a change in temperature, in the conventional fluidic lens, the shape of an elastic membrane deforms due to a change in pressure applied to the lens surface, caused by expansion or constriction of the optical fluid, which changes the refractive index of the fluidic lens.

For example, when the conventional fluidic lens has an internal space size of 5.3 mm×5.3 mm×0.3 mm(=width× length×height) and a lens portion whose diameter is 2.4 mm, deformation of the lens surface is maximally about ±134 μm when there is a temperature change of 40° C. (for example, when the temperature rises from 20° C. to 60° C. or decreases from 20° C. to −20° C.). That is, when the temperature increases or decreases by 40° C. from a room temperature, the elastic membrane 120 corresponding to the lens portion protrudes outward to a height of maximally 134 μs or depresses inward to a depth of maximally 134 μm. Since a deformable threshold range (that is, the allowable deformation range of the lens surface of an optical lens) of a lens surface is known to be about ±15 μm in a fluidic lens whose diameter is about 2.4 mm, the conventional fluidic lens using the glass substrate has difficulty in maintaining a constant focal point within a normal operating temperature range (from −20° C. to 60° C.) of electronic devices.

The optical apparatus 100 may prevent or minimize such deformation of the lens surface by forming the thermally deformable plate 150 with a single transparent material having a large CTE in order to compensate for changes in volume of the optical fluid 125. For this, the thermally deformable plate 150 may be formed with a material having the substantially same CTE as the optical fluid 125 or with a material having a CTE greater than that of the optical fluid 125. Here, the meaning of "the CTEs of the thermally deformable plate 150 and the optical fluid 125 are substantially the same" is not limited to the case where the CTE of the thermally deformable plate 150 is numerically the same as that of the optical fluid 125, and may be interpreted to include the case where the CTE of the thermally deformable plate 150 has a CTE value (that is, a CTE value at which a change of a refractive index of the optical apparatus 100 with respect to a temperature change is within a predetermined allowable range) capable of compensating for a change in volume of the optical fluid 125 with respect to a temperature change, although the CTE of the thermally deformable plate 150 is smaller than that of the optical fluid 125. For example, the case where the CTE of the thermally deformable plate 150 is 50% or more of that of the optical fluid 125 may correspond to the case where the CTEs of the thermally deformable plate 150 and the optical fluid 125 are substantially the same. In an exemplary embodiment, the CTE rnage of the thermally deformable plate 150 is from 180 to 320 ppm/° C., while the CTE range for the optical fluid is from 280 to 380 ppm/° C.

Also, the thermally deformable plate 150 may be formed with a material that has elastic deformation characteristics and is stable over a wide temperature range including the operating temperature range of the optical apparatus 100. If the thermally deformable plate 150 is formed with a material allowing plastic deformation although the thermally deformable plate 150 has a large CTE, the dimension of the thermally deformable plate 150 may change due to repeated expansion and constriction according to changes in temperature. Accordingly, by forming the thermally deformable plate 150 with a material allowing elastic deformation, the dimensions of the thermally deformable plate 150 may be maintained constant even when the optical apparatus 100 is exposed to changes in temperature for a long time.

Also, like the optical fluid 125, by forming the thermally deformable plate 150 with a material allowing elastic deformation, a change in volume of the optical fluid 125 may be more effectively compensated for. Also, since the thermally deformable plate 150 seals up the optical fluid 125, like the elastic membrane 120, the thermally deformable plate 150 may be formed with a hydrophobic material having excellent chemical resistance and low hygroscopicity. Also, the thermally deformable plate 150 has to have excellent transmittance.

Representative materials that satisfy the above-described properties of the thermally deformable plate 150 include elastomer such as silicone elastomer, silicone resin, and the like. The silicone elastomer may be polydimethylsiloxane (PDMS), polymethylphenylesiloxane (PMPS), polymethylvinylsiloxane (PMVS), fluro-silicone elastomer, or the like. Any other materials or substances which satisfy the above physical characteristics may be suitably used. The PDMS among the above-mentioned materials has a large CTE, excellent elasticity property, and excellent transmittance, and also has low surface tension and nonionic and nonpolar properties. That is, the PDMS is chemically stable at a high temperature as well as at a low temperature, and shows heat-resisting property, weather resistance (UV, ozone), and oxidation stability. For example, since a PDMS plate has a large CTE of about 300 ppm/° C. and is reliable enough to be stable even at a high temperature of 300° C. or more, the PDMS plate can be subject to subsequent processes at high-temperature. When the thermally deformable plate 150 is formed with PDMS, the thermally deformable plate 150 has a thickness of about 100 μm to 500 μm.

As described above, the thermally deformable plate 150 deforms to increase the volume of the internal space when a temperature rises, and to decrease the volume of the internal space when the temperature decreases. Such deformation of the thermally deformable plate 150 is caused directly due to changes in temperature, not caused indirectly by changes in volume of the optical fluid 125, that is, by an increase/decrease of pressure due to changes in volume of the optical fluid 125. In other words, since the volume of the internal space increases or decreases due to deformation of the thermally deformable plate 150 caused directly by changes in temperature, the optical apparatus 100 may maintain pressure applied to the elastic membrane 120 by the optical fluid 125 to be constant or minimize changes in pressure applied to the elastic membrane 120 although the volume of the optical fluid 125 increases or decreases due to the changes in temperature. Accordingly, the optical apparatus 100 or an imaging device including the optical apparatus 100 shows little change in optical power or limits changes in optical power below a predetermined threshold when a temperature changes within a normal operating temperature range.

In order to compensate for changes in volume of the optical fluid 125 due to changes in temperature, the thermally deformable plate 150 deforms to protrude outward to be convex when temperature rises, and deforms to depress inward to be concave when the temperature decreases. That is, the thermally deformable plate 150 deforms to have predetermined directionality in correspondence to a change in temperature. Since the width of the thermally deformable plate 150 increases when the temperature rises and decreases when the temperature decreases, and the volume of the optical fluid 125 also increases or decreases according to changes in temperature, deformation of the thermally deformable plate 150 may have the above-described directionality. However, there is possibility that displacement of the thermally deformable plate 150 will not sufficiently compensate for a change in volume of the optical fluid 125, and the possibility further increases particularly when the temperature decreases.

In order to compensate for the deformation directionality of the thermally deformable plate 150 and allow sufficient deformation of the thermally deformable plate 150, the thermally deformable plate 150 may be subject to initial deformation to have an outwardly (upwardly in FIG. 3) convex shape with a predetermined height $d_1$. The thermally deformable plate 150 having the convex shape deforms into a more convex shape as a temperature increases, and deformed into a less convex shape or into a flat shape as the temperature deceases. The height $d_1$ of initial deformation may be from about 25 μm to 200 μm. However, the height $d_1$ may depend on the size of the optical apparatus 100. For example, in the case of an optical apparatus in which the size of its internal space is about 5.3 mm×5.3 mm×0.3 mm(=width×length× height), the diameter of a lens portion is about 2.4 mm, and the thickness of the thermally deformable plate 150 is about 300 μm, the height $d_1$ of initial deformation may be from about 50

µm to 200 µm. In an exemplary embodiment, the portion of the thermally deformable plate 150 extending toward its center may be angled upwardly at 0.1 degrees (above the horizontal in FIG. 3) at room temperature. In another exemplary embodiment, the angle may be 8 degrees.

The initial deformation of the thermally deformable plate 150 helps efficiently compensate for a decrease in volume of the optical fluid 125, particularly, when the temperature decreases. In other words, the thermally deformable plate 150 deforms such that its upwardly protruded center portion becomes flat (that is, such that the height $d_1$ of the convex shape is reduced) to reduce the volume of the internal space. Unlike this, a flat, thermally deformable plate not subject to initial deformation is difficult to be deformed to sufficiently reduce the volume of the internal space in correspondence to a decrease in volume of the optical fluid 125 when a temperature decreases.

Figure 4A:
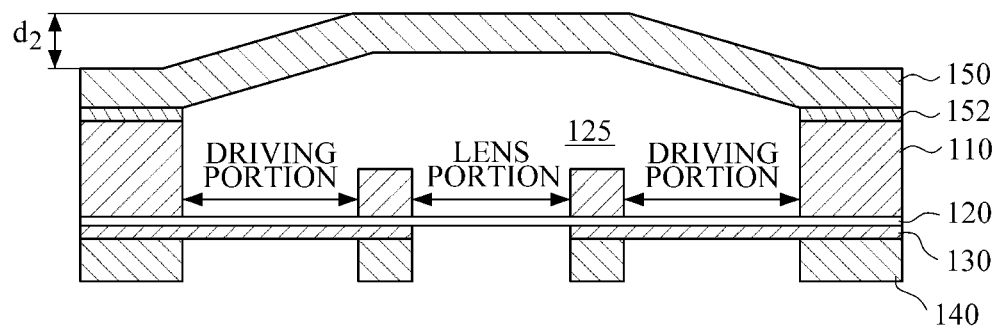
FIG. 4A is a cross-sectional view illustrating an example of a deformed structure of the optical apparatus illustrated in FIG. 3 when a temperature rises.
Figure 4B:
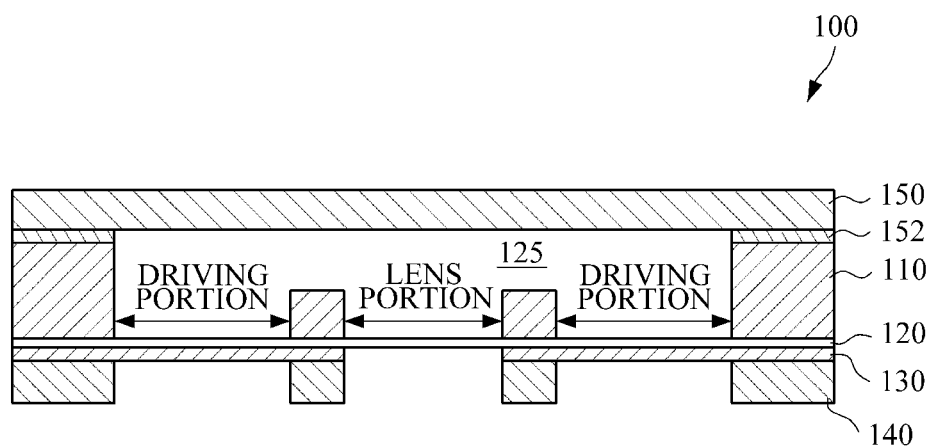
FIG. 4B is a cross-sectional view illustrating an example of a deformed structure of the optical apparatus illustrated in FIG. 3 when a temperature decreases.

FIGS. 4A and 4B are cross-sectional views illustrating examples where the optical apparatus 100 illustrated in FIG. 3 deforms according to changes in temperature, wherein FIG. 4A corresponds to the case where the temperature rises from 20° C. to 60° C., and FIG. 4B corresponds to the case where the temperature decreases from 20° C. to −20° C. Referring to FIG. 4A, when the temperature rises, displacement of the thermally deformable plate 150 of the optical apparatus 100 increases ($d_1<d_2$) so that the thermally deformable plate 150 protrudes more outward. Referring to FIG. 4B, when the temperature decreases, displacement of the thermally deformable plate 150 of the optical apparatus 100 decreases so that the thermally deformable plate 150 deforms more inward to be flat. The profile of the lens surface of the optical apparatus 100, that is, the profile of the elastic membrane 130 corresponding to the lens portion may change little or be changed within an allowable range regardless of changes in temperature.

In the optical apparatus 100, the portion of the thermally deformable plate 150 corresponding to the lens portion, that is, the center portion of the thermally deformable plate 150 has a substantially flat shape. The flat shape of the center portion of thermally deformable plate 150 has to be maintained regardless of changes in temperature. This is aimed at preventing incident light from being refracted by the thermally deformable plate 150. In order to prevent incident light from being refracted or to minimize the amount of refraction, the center portion of the thermally deformable plate 150 has a size capable of covering at least the lens portion.

Figure 5A:
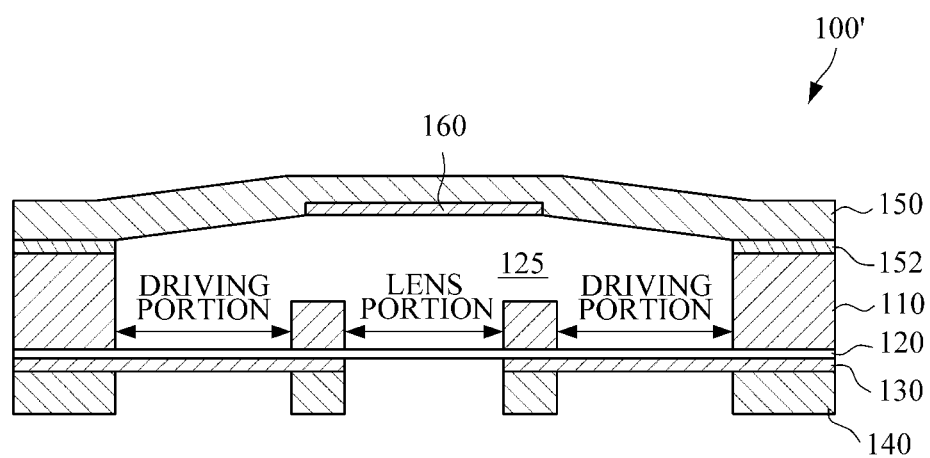
FIG. 5A is a cross-sectional view illustrating a modified example of the optical apparatus illustrated in FIG. 3.
Figure 5B:
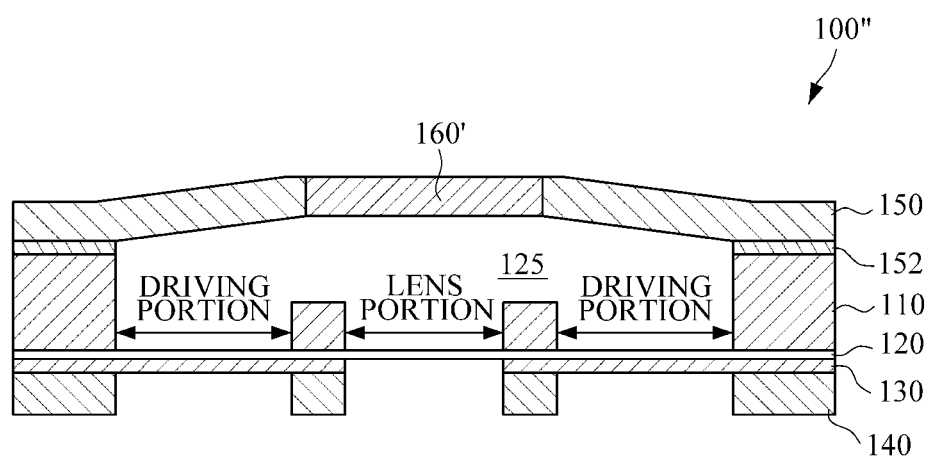
FIG. 5B is a cross-sectional view illustrating another modified example of the optical apparatus illustrated in FIG. 3.

In order to make the center portion of the thermally deformable plate 150 have a flat shape and maintain the flat shape of the center portion regardless of changes in temperature, the optical apparatus 100 may further include a stiffening member disposed at a location corresponding to the lens portion. FIGS. 5A and 5B are cross-sectional views illustrating examples of optical apparatuses 100' and 100" including stiffening members 160 and 160', respectively. Referring to FIGS. 5A and 5B, the optical apparatuses 100' and 100" are different from the optical apparatus 100 illustrated in FIG. 3 in that a stiffening member 160 or 160' is embedded into a thermally deformable plate 150. The stiffening members 160 and 160' are used to prevent the thermally deformable plate 150, specifically, a portion of the thermally deformable plate 150 corresponding to a lens portion from being deformed. Accordingly, the stiffening members 160 and 160' may be formed with a rigid, transparent material. For example, the stiffening members 160 and 160' may be formed with transparent glass, transparent polyimide, transparent polyester sulfone (PES), or the like. In alternative embodiments, the stiffening members 160 and 160' maybe made of a PDMS material cured with more hardening agent than the PDMS material used for the thermally deformable plate. Also, the stiffening members 160 and 160' may have a circle shape corresponding to the shape of the lens portion, or a square or polygon shape having a size capable of covering the entire lens portion.

As illustrated in FIG. 5A, the stiffening member 160 may be embedded into the inside of the thermally deformable plate 150, for example, into the lower portion of the thermally deformable plate 150. Since the stiffening member 160 embedded into the inside of the thermally deformable plate 150 can be prevented from being exposed to air, moisture, etc., the stiffening member 160 may be formed with various materials without any limitation (for example, moisture resistance). In this case, the stiffening member 160 may be formed with a thickness thinner than that of the thermally deformable plate 150. For example, the thickness of the stiffening member 160 may be from about ¼ to ¾ (from about 50 µm to 300 µm) of that of the thermally deformable plate 150.

Unlike the above, the stiffening member 160 may be alternatively attached onto the upper and/or lower surface of the thermally deformable plate 150. Also, as illustrated in FIG. 5B, the stiffening member 160' may be formed with the same thickness as the thermally deformable plate 150. In this case, the stiffening member 160' may substitute a portion of the thermally deformable plate 150, corresponding to the lens portion. In both the former and latter cases, since the stiffening member 160' may be exposed to air, the optical fluid 125, etc., the stiffening member 160' may be formed with a material having excellent chemical resistance and moisture resistance.

Referring again to FIGS. 1, 2, and 3, the thermally deformable plate 150 (the thermally deformable plate 150 may include the stiffening member 160 or 160' as illustrated in FIG. 5A or 5B) having a size corresponding to the size of the spacer frame 110 may be attached onto the spacer frame 110 using predetermined adhesive 152. The predetermined adhesive 152 may be Ultra Violet (UV) curable epoxy adhesive. However, the predetermined adhesive 152 may be any other adhesive means selected to effectively adhere the thermally deformable plate 150 to the spacer frame 110 in consideration of their materials.

Figure 6:
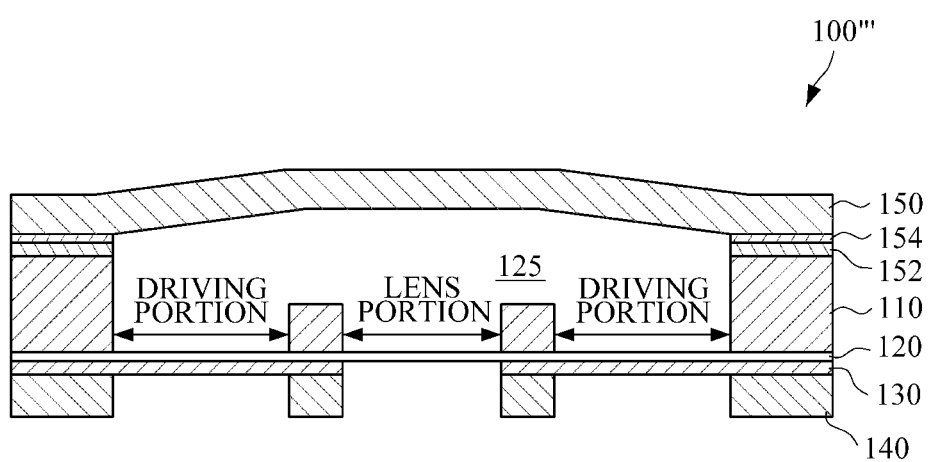
FIG. 6 is a cross-sectional view illustrating another modified example of the optical apparatus illustrated in FIG. 3.

FIG. 6 is a cross-sectional view illustrating another modified example 100''' of the optical apparatus 100 illustrated in FIG. 3. Referring to FIG. 6, the optical apparatus 100''' may further include an adhesive assistance pattern 154 to firmly and easily adhere the thermally deformable plate 150 to the spacer frame 110. The adhesive assistance pattern 154 may be inserted into the interface between the spacer frame 110 and the thermally deformable plate 150, in more detail, into the interface between the adhesive 152 and the thermally deformable plate 150. The adhesive assistance pattern 154 may be made of a material selected in consideration of materials of the spacer frame 110 and the thermally deformable plate 150. For example, when the spacer frame 110 is formed with silicon and the thermally deformable plate 154 is formed with silicone elastomer such as PDMS, the adhesive assistance pattern 154 may be formed with a silicon compound, such as silicon oxide or silicon nitride. The adhesive assistance pattern 154 formed with silicon compound acts to supplement the low adhesive property of silicone elastomer whose molecular structure, chemical properties, etc., are different from those of silicon.

Accordingly, the adhesive assistance pattern 154 may be formed with silicon oxide along the edge of the thermally deformable plate 150. A method of forming the adhesive assistance pattern 154 is not limited. For example, the adhesive assistance pattern 154 may be formed on the edge of the thermally deformable plate 150 using pattern photolithography. In more detail, the adhesive assistance pattern 154 is formed with silicon oxide or the like on a substrate allowing pattern photolithography. The adhesive assistance pattern 154 may be formed with an appropriate shape and width in consideration of the interface between the thermally deformable plate 150 and the spacer frame 110. Then, the surface of the thermally deformable plate 150 to which a pattern will be transferred is subject to plasma treatment (for example, plasma treatment using oxygen as treatment gas), and then the thermally deformable plate 150 subject to surface treatment is attached onto the substrate on which the adhesive assistance pattern 154 has been formed, so that pattern transfer toward the thermally deformable plate 150 is performed.

Figure 7:
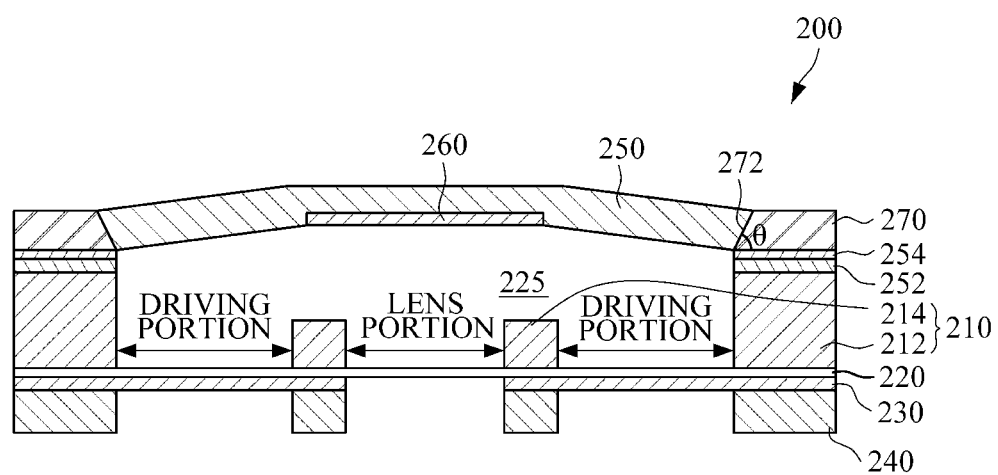
FIG. 7 is a cross-sectional view illustrating another example of an optical apparatus.

FIG. 7 is a cross-sectional view illustrating another example of an optical apparatus 200. Referring to FIG. 7, the optical apparatus 200 includes a spacer frame 210, an elastic membrane 220, a thermally deformable plate 250, a flange unit 270, and an optical fluid 225, and may further include an actuator 230 and an actuator frame 240. FIG. 7 shows the case where the optical apparatus 200 is at a room temperature (for example, 20° C.). The optical apparatus 200 illustrated in FIG. 7 is different from the optical apparatus 100 illustrated in FIGS. 1, 2, and 3 in that the optical apparatus 200 further includes the flange unit 270. Hereinafter, the optical apparatus 200 may be described based on the difference from the optical apparatus 100. Parts not described in detail in the following description can be understood from the above description regarding the optical apparatus 100.

The spacer frame 210 defines a predetermined internal space and includes sidewalls 212 surrounding the internal space. The spacer frame 210 may further include a partition 214 to partition the internal space into a lens portion and a driving portion that connect to each other. The optical fluid 225 is filled in the internal space defined by the spacer frame 210, that is, in the driving portion and lens portion, and the optical fluid 225 filled in the internal space is sealed up by the thermally deformable plate 250 and the elastic membrane 220 disposed or attached on the bottom of the spacer frame 210. Also, a polymer actuator 230 is disposed on the elastic membrane 220 at a location corresponding to the driving portion, and the polymer actuator 230 may be fixed on the spacer frame 210 by the actuator frame 240.

The thermally deformable plate 250 is formed with a single transparent material, and attached onto the top surface of the spacer frame 210, that is, onto the opposite surface of the surface of the spacer frame 210 on which the elastic membrane 220 is attached. The thermally deformable plate 250 has a flat shape as illustrated in FIG. 4B, or a shape protruded outward (upwardly in FIG. 7) at a location corresponding to the lens portion. Unlike the thermally deformable plate 150 of the optical apparatus 100 or 100', having the same size (width) as the spacer frame 110, the thermally deformable plate 250 of the optical apparatus 200 is smaller than the spacer frame 210. In more detail, the size of the thermally deformable plate 250 corresponds to the size of the internal space, and the flange unit 270 is disposed along the edge (that is, on the top surface of the spacer frame 210, corresponding to the difference in size between the spacer frame 210 and the thermally deformable plate 250) of the thermally deformable plate 250. That is, the thermally deformable plate 250 is positioned inside the flange unit 270 that is formed in an annular shape (for example, a square annular shape) in correspondence to the sidewalls of the spacer frame 210.

The flange unit 270 may be formed with a material having excellent bonding property with the spacer frame 210 and a CTE similar to that of a material (for example, silicon) forming the spacer frame 210. For example, the flange unit 270 may be formed with glass. However, the flange unit 270 may be formed with any other material based on silicon. Since glass forming the flange unit 270 has a molecular structure and chemical properties similar to silicon forming the spacer frame 210, the flange unit 270 can be bonded with the spacer frame 210 using general adhesive 252 such as Ultra Violet (UV) curable epoxy adhesive. Accordingly, an adhesive assistance pattern (see FIG. 6) for improving adhesive strength does not need to be inserted into the interface between the flange unit 270 and the spacer frame 210.

Also, the flange unit 270 formed with glass having a CTE of about 3.5 ppm/° C. and the spacer frame 210 formed with silicon having CTE of about 2.6 ppm/° C. have a small CTE difference therebetween. The small CTE difference between the flange unit 270 and the space frame 210 means that the flange unit 270 and the spacer frame 210 may similarly expand or contract, i.e., expand or contract together, when a temperature changes. Accordingly, since no stress is caused in the interface between the spacer frame 210 and the flange unit 270, the optical apparatus 200 may have high reliability against thermal shock. Also, since the flange unit 270 is formed with a material having a small CTE like the spacer frame 210, warpage and breakdown that the spacer frame 210 having a thin thickness of about 300 μm is bended or broken by thermal shock at a high temperature (for example, during a reflow process at about 250° C.) may be prevented.

Also, the interface between the flange unit 270 and the thermally deformable plate 250 may have an inclination of a predetermined angle θ such that the width of the flange unit 270 is reduced and the width of the thermally deformable plate 250 is increased outwardly (upwardly in FIG. 7), that is, toward the opposite side with respect to the spacer frame 210. The inclined angle θ of the interface 272 between the flange unit 270 and the thermally deformable plate 250 allows the thermally deformable plate 250 to be more easily deformed according to a change in temperature (particularly, according to an increase in temperature), than the case where when a thermally deformable plate having a shape protruded outward has no interface inclination (that is, θ=90°). Also, the interface 272 having the predetermined inclination may reduce thermal stress that is caused when the flange unit 270 and the thermally deformable plate 250 have a large CTE difference. The inclined angle θ of the interface 272 may be from about 30° to 90°.

Figure 8A:
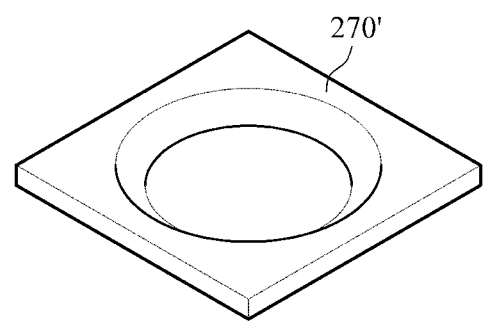
FIG. 8A is a perspective view illustrating an example of a flange unit included in the optical apparatus illustrated in FIG. 7.
Figure 8B:
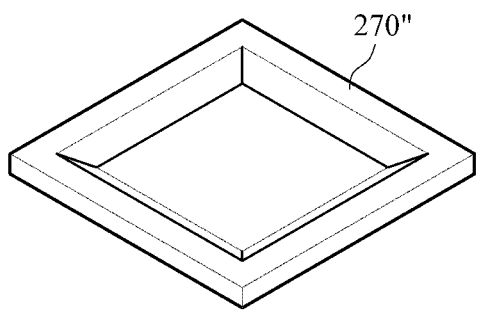
FIG. 8B is a perspective view illustrating another example of a flange unit included in the optical apparatus illustrated in FIG. 7.

FIGS. 8A and 8B are perspective views illustrating examples of flange units 270' and 270" that can be included in the optical apparatus 200 illustrated in FIG. 7. It is seen from FIGS. 8A and 8B that the inner sidewall of each of the flange units 270' and 270", which form an interface with the thermally deformable plate 250 (see FIG. 7), has a predetermined inclination such that the width at the top of each of the flange units 270' and 270" is reduced. The inner sidewall of the flange unit 270' illustrated in FIG. 8A is in a circular form, while the inner sidewall of the flange unit 270" illustrated in FIG. 8B is in a square form. In the former case (see FIG. 8A), since the thermally deformable plate 250 is symmetrical to an optical axis, the deformation of the thermally deformable plate 250 may be symmetrical to the optical axis. Also, in the latter case (see FIG. 8B), since the thermally deformable plate 250 has the same square shape as an internal space defined by a spacer frame, the thermally deformable plate 250 may be easily fabricated.

Figure 9A:
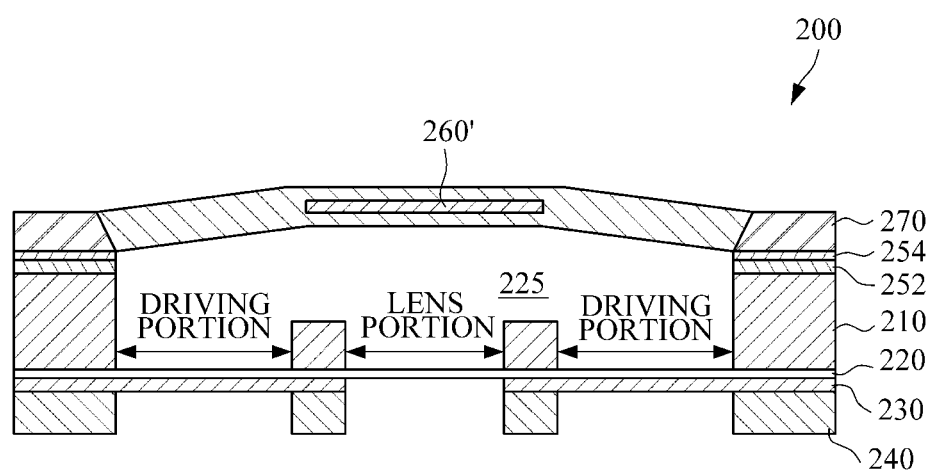
FIG. 9A is a cross-sectional view illustrating a modified example of the optical apparatus illustrated in FIG. 7.
Figure 9B:
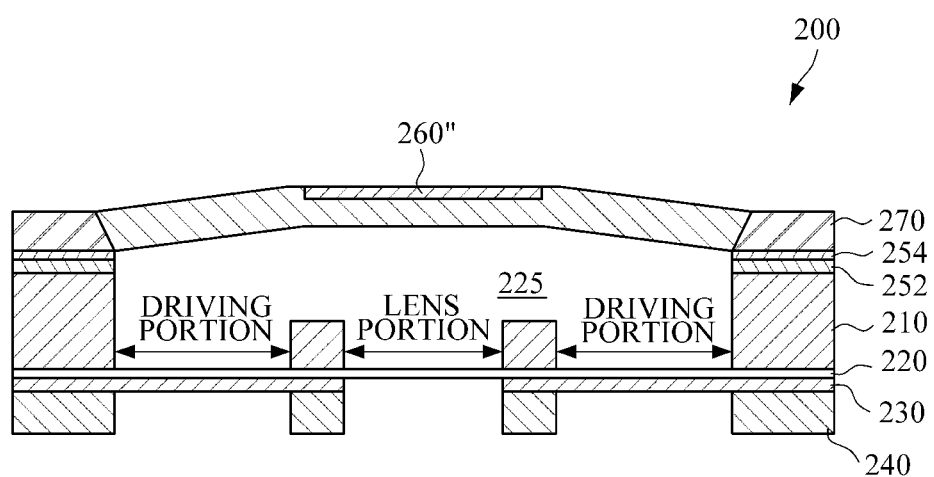
FIG. 9B is a cross-sectional view illustrating another modified example of the optical apparatus illustrated in FIG. 7.

Also, in the optical apparatus 200, the portion of the thermally deformable plate 250, corresponding to the lens portion, may be substantially flat. In addition, the optical apparatus 200 may further include the stiffening member 260 disposed in the thermally deformable plate 250 at a location corresponding to the lens portion. The stiffening member 260 may have a thickness thinner than that of the thermally deformable plate 250, and be embedded into the inside of the thermally deformable plate 250. For example, the stiffening member 260 may be positioned below the thermally deformable plate 250. Or, as illustrated in FIG. 9A, a stiffening member 260' may be embedded into the thermally deformable plate 250, or as illustrated in FIG. 9B, a stiffening member 260" may be positioned on the upper surface of the thermally deformable plate 250.

Hereinafter, the results of a simulation and test using the optical apparatuses according to the above-described examples will be described.

The simulation has been performed based on ABAQUS Ver. 6.8 CAE & Standard which is software dedicated to Finite Element Analysis (FEA), and linear thermal-elastic deformation is performed in consideration of nonlinear geometry, wherein pressure caused by optical fluid is ignored.

Figure 10:
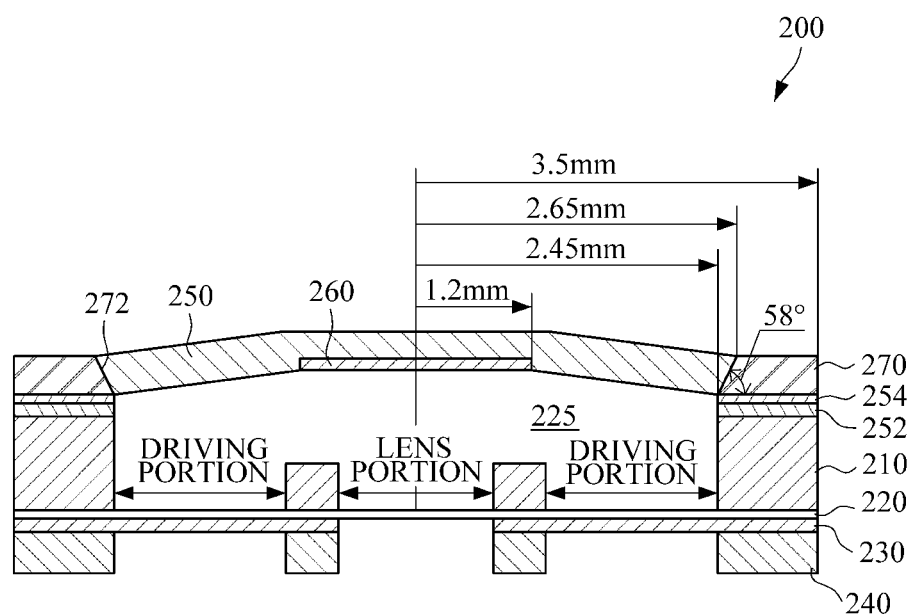
FIG. 10 shows the sizes of elements included in the optical apparatus of FIG. 7 used in a test.

In the simulation, the optical apparatus 200 described above with reference to FIG. 7 is used, and details regarding the sizes of individual components of the optical apparatus 200 are shown in FIG. 10. In FIG. 10, the spacer frame 210 of the optical apparatus 200 is in a rectangular shape having a size of about 7 mm×7 mm×330 μm(=width×length×height), the internal space defined by the spacer frame 210 has a size of about 4.9 mm×4.9 mm×330 μm (=width×length×height), and the lens portion has a circular shape whose diameter is about 2.4 mm. The interface between the thermally deformable plate 250 and the flange unit 270 has an inclination of about 58°. The thermally deformable plate 250 is formed as a PDMS plate having a Young's Modulus of 1.0 MPa, a CTE of about 58 ppm/° C., and a thickness of 300 μm, wherein the PDMS plate is subject to initial deformation such that its center portion protrudes out by about 120 μm. The stiffening member 260 is formed with polyimide having a Young's Modulus of 3.2 Gpa, a CTE of about 58 ppm/° C., and a thickness of 200 μm. The optical fluid 225 may be silicone oil having a CTE of 330 ppm/° C. Also, the simulation has been performed within a temperature range from −20° C. to 60° C., which is the operating temperature range of the corresponding electronic device (that is, the optical apparatus 200).

Table 1 lists the results of the simulation, and shows displacement between the thermally deformable plate 250 and the lens surface when a temperature changes. Referring to Table 1, when the temperature rises from 20° C. to 60° C., the thermally deformable plate 250 protrudes more by about 51.1 μm, while the lens surface has displacement of about 6.3 μm. Meanwhile, when the temperature decreases from 20° C. to −20° C., the thermally deformable plate 250 is depressed by 39.2 μm, while the lens surface has displacement of about 7.8 μm. Accordingly, it is seen that the displacement of the lens surface is smaller than a predetermined allowable threshold range (±15 μm).

TABLE 1

|  | When Temperature Rises From 20° C. to 60° C. | When Temperature Decreases From 20° C. to −20° C. |
| --- | --- | --- |
| Displacement of Thermally Deformable Plate | 51.1 μm | −39.2 μm |
| Displacement of Lens Surface | −6.3 μm | 7.8 μm |

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical apparatus comprising:
   a spacer frame comprising an internal space having an internal partition, the internal space comprising a driving portion and a lens portion that is connected to the driving portion, and the internal partition dividing the driving portion and the lens portion;
   an elastic membrane attached to a first surface of the spacer frame, to cover at least the lens portion;
   a thermally deformable member directly disposed over the internal space, disposed on a second surface of the spacer frame, opposite to the first surface, and formed from a single transparent material, the thermally deformable member being deformable to increase or decrease a volume of the internal space according to a change in temperature; and
   optical fluid disposed in the internal space.

2. The optical apparatus of claim 1, wherein the thermally deformable member is formed with a material having a Coefficient of Thermal Expansion (CTE) that is substantially same as a CTE of the optical fluid.

3. The optical apparatus of claim 1, wherein the thermally deformable member is formed with a material having a Coefficient of Thermal Expansion (CTE) that is 50% or more than a CTE of the optical fluid.

4. The optical apparatus of claim 1, wherein the thermally deformable member is formed with a hydrophobic material which allows substantially linear elastic deformation of the thermally deformable member within an operating temperature range of a fluidic lens.

5. The optical apparatus of claim 4, wherein the thermally deformable member is formed with silicon elastomer or silicon resin.

6. The optical apparatus of claim 5, wherein the thermally deformable member is formed with polydimethylsiloxane (PDMS).

7. The optical apparatus of claim 5, wherein the spacer frame is formed with silicon, and an adhesive assistance pattern formed with silicon oxide or silicon nitride is inserted between the spacer frame and the thermally deformable member.

8. The optical apparatus of claim 1, wherein a portion of the thermally deformable member corresponding to the lens portion, protrudes more outward than an edge portion of the thermally deformable member.

9. The optical apparatus of claim 8, wherein the portion of the thermally deformable member corresponding to the lens portion, is flat.

10. The optical apparatus of claim 1, wherein a viscosity of the optical fluid is less than 100 cP.

11. The optical apparatus of claim 1, wherein the driving portion and the lens portion are connected so that the optical fluid flows nearly instantaneously therebetween.

12. The optical apparatus of claim 1, wherein the optical fluid freely flows between the driving portion and the lens portion.

13. The optical apparatus of claim 1, wherein the thermally deformable member deforms to increase the volume of the internal space according to an increase in the temperature so that a distance between the thermally deformable member and the elastic member increases.

14. The optical apparatus of claim 1, wherein the internal partition of the spacer frame is thinner than an outer edge portion of the spacer frame.

15. The optical apparatus of claim 1, wherein a portion of the thermally deformable member disposed over the lens portion is deformable to increase or decrease the volume of the internal space according to the change in temperature.

* * * * *